United States Patent [19]
Henson et al.

[11] 3,772,763
[45] Nov. 20, 1973

[54] IMPROVED LIGHTWEIGHT CRANKSHAFT

[75] Inventors: Ralph B. Henson, Creve Coeur;
William G. Johnson, Pekin, both of Ill.

[73] Assignee: Caterpillar Tractor Co., Peoria, Ill.

[22] Filed: Feb. 17, 1971

[21] Appl. No.: 116,113

[52] U.S. Cl. ............................ 29/470.3, 29/6, 228/2
[51] Int. Cl. ............................................. B23k 27/00
[58] Field of Search ............... 29/470.3, 6; 156/73; 228/2

[56] References Cited
UNITED STATES PATENTS

| | | | |
|---|---|---|---|
| 2,364,109 | 12/1944 | Taylor | 29/6 X |
| 3,465,545 | 9/1969 | Stamm | 29/470.3 X |
| 3,144,702 | 8/1964 | Wuppermann | 29/6 |
| 2,403,049 | 7/1946 | Carstens | 29/6 |

*Primary Examiner*—J. Spencer Overholser
*Assistant Examiner*—Robert J. Craig
*Attorney*—Fryer, Tjensvold, Feix, Phillips & Lempio

[57] ABSTRACT

A lightweight crankshaft is manufactured by providing a plurality of initially completely discrete crankshaft segments, some of which are generally tubular, and joining complementary faces of the segments to each other by friction welding.

6 Claims, 2 Drawing Figures

PATENTED NOV 20 1973          3,772,763

INVENTORS
RALPH B. HENSON
WILLIAM G. JOHNSON
BY
Fryer, Tjensvold, Dix, Phillips & Lempio
ATTORNEYS

IMPROVED LIGHTWEIGHT CRANKSHAFT

BRIEF DESCRIPTION OF THE INVENTION

This invention relates to crankshafts and more particularly to a new and improved lightweight crankshaft and a method for manufacturing same. The invention is specifically directed to a lightweight crankshaft comprising a plurality of initially discrete web segments and tubular journal segments which have complementary surfaces joined to each other by friction welding.

Conventional crankshafts in use today are normally cast or forged in one piece. Cast crankshafts are used primarily in low strength applications such for example in smaller automobile engines. Forged crankshafts, on the other hand, are used primarily in high stress applications such as high output diesel engines. In any event, the complex shape of some crankshafts makes them difficult to manufacture and when produced in one piece it is often necessary to use lightening holes and other machining means to reduce overall weight.

Prior art attempts to forge individual crankshaft segments and subsequently join the segments by means of conventional welding techniques have proven to be too costly and time consuming except in limited applications such as the crankshafts which are used in aircraft engines. One of the problems involved in such prior art conventional welding of forged crankshaft segments resides in the problems involved in orienting the individual segments with respect to each other and then welding them together. Such a procedure involves the costly and time-consuming operation of constructing an orienting fixture and further necessitates subjecting the welded forging to heat treatment operations in order to assure suitable material in the weld zone.

The present invention is based in part on the discovery that a friction welding technique may be utilized to join a plurality of crankshaft segments to each other to form a completed crankshaft without the drawbacks associated with the aforementioned attempts to join such segments to each other by means of conventional welding techniques.

Friction welding may be generally described as a process wherein two workpieces are subjected to relative rotation while in rubbing contact with each other to generate friction heat to raise the workpieces to a suitable welding temperature, whereupon the relative rotation is stopped and a bond is formed between the workpieces.

A recent advance in the friction welding art comprises the use of a friction welding process known as inertia friction welding. Inertia friction welding is a special type of friction welding wherein the energy required to bring the common interface of the workpieces to a bondable condition is stored as kinetic energy in rotating inertia weights. These weights generally take the form of flywheels that are connected to one of the workpieces and the entire energy necessary to form the bond is stored in the weights prior to engagement of the workpieces at the interface. The stored energy is discharged into the interface through frictional heating and plastic working developed at the interface as the rubbing contact slows the rotating weights and the bonding cycle is concluded. While the present invention relates in general to the joining of forged crankshaft segments by means of friction welding, it has been found that the inertia friction welding process is particularly suitable for this application.

The principle object of the present invention is to provide a lightweight crankshaft which comprises a plurality of individual crankshaft segments which are joined to each other by friction welding.

Another object of the present invention is to provide a lightweight crankshaft which comprises a plurality of individual crankshaft segments comprising, inter alia, journal segments which are of generally tubular construction and subsequently joining all the segments to each other by friction welding.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENTS

Figure 1:
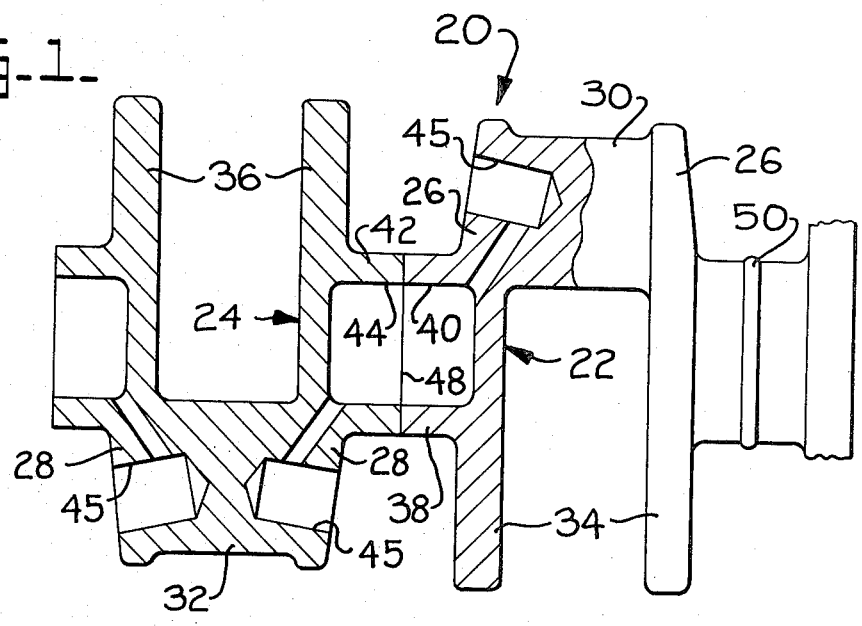
FIG. 1 is a longitudinal view, partially in section, of a portion of a crankshaft constructed in accordance with the present invention; and, FIG. 2 is a longitudinal view, similar to FIG. 1, illustrating a modified embodiment of the present invention.

Referring now to FIG. 1 there is shown a crankshaft 20 which comprises a plurality of forged segments as shown at 22 and 24. Each of the forged segments comprises a web portion, such as shown at 26 and 28, which has a connecting rod journal, as shown at 30 and 32, associated therewith. The forged segments 22 and 24 may also be provided with counterweights as shown at 34 and 36.

It should also be noted that each of the forged segments is provided with one half of a main bearing journal. Thus, the forged segment 22 is provided with a first journal half 38 having an enlarged bore 40 formed therein. Likewise, the forged segment 24 is provided with a second journal half 40 which also has an enlarged bore 44 formed therein. The enlarged bores 40 and 44 are important in the construction of the crankshaft because they reduce the overall weight of the crankshaft and also reduce the cost thereof because less material is used in the main journal due to its hollow construction. Further weight reduction of the crankshaft may be accomplished by providing lightening holes 45 in the connecting rod journals 30 and 32.

The forged crankshaft segments 22 and 24 may be joined to each other by forming a friction weld at the common interface 48 formed by the complementary faces of the journal halves 38 and 42. In such a friction welding operation the forged crankshaft segment 22 is held stationary in the chuck of a friction welding machine (not shown). The forged crankshaft segment 24 is chucked in a rotating spindle (not shown) of the friction welding machine. The crankshaft segment 24 is then rapidly rotated and the crankshaft segments 22 and 24 are forced into engagement under axial pressure and a friction weld is quickly formed at the interface 48 between the journal halves 38 and 42. Such a completed friction weld would take the form shown at 50 and a subsequent machining operation would be performed to remove the protruding weld flash formed during the welding operation. It should also be noted that recently developed friction welding machines have rotational alignment features so that the desired angular alignment between the crankshaft segments may be achieved.

Figure 2:
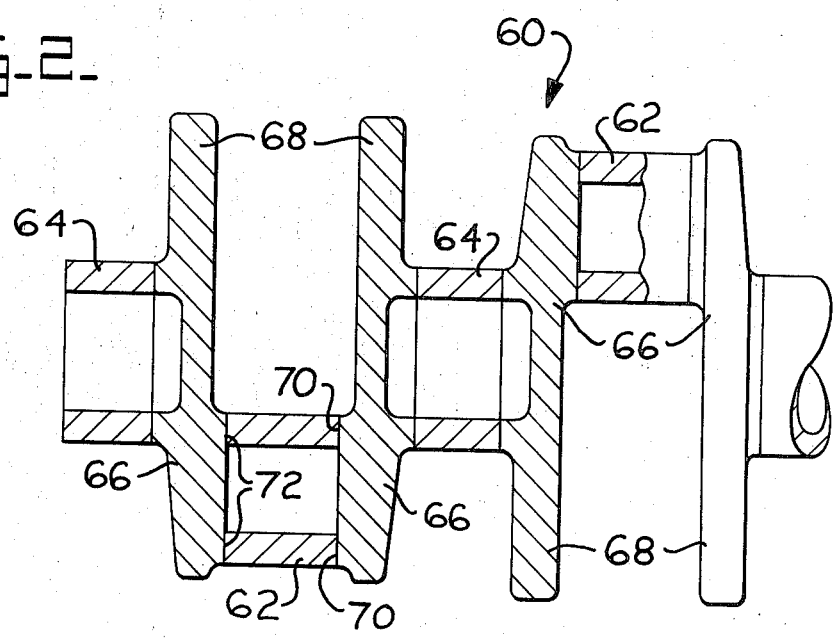

FIG. 2 illustrates a modified embodiment of the crankshaft of the present invention. In FIG. 2 all of the journal portions of the crankshaft comprise individual tubular segments. Thus, both the connecting rod journals 62 and the main journals 64 are formed as individual tubular segments. These tubular segments are joined to individual web members 66 and the web members 66 may be provided with counterweights 68 where required.

The individual web segments 66 and tubular journal segments 62 and 64 may be joined to each other by a friction welding operation as described with respect to FIG. 1. However, it should be noted that such a friction welding operation could be modified to form a pair of simultaneous friction welds between each end of a tubular journal segment and two discrete web segments. For example, a pair of web segments 66 may be held stationary in a pair of chucks located on each side of a hollow rotatable center chuck. A tubular journal segment, such as shown at 62 or 64, is then placed in the hollow rotatable center chuck and properly aligned with complementary faces on each of the web segments 66. The rotatable center chuck is then rapidly rotated and the web shaped crankshaft segments 66 are forced into engagement with each end of the rotating journal segment and a pair of friction welds such as shown at 70 and 72 are quickly formed therebetween.

By providing individual tubular journal segments 62 and 64 a reduction in the cost of the crankshaft can be accomplished since the web segments 68 may be formed from less exotic metals than are required on the bearing surfaces provided at the journal segments. In addition, the tubular shape of the journals in the crankshaft of FIG. 2 provides a relatively lightweight crankshaft without the drawbacks associated with lightening holes.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A method of manufacturing a lightweight crankshaft comprising the steps of:
    forming a first crankshaft segment into a shape which includes both a connecting rod journal and a first half of a main bearing journal, said first main journal half having an enlarged bore formed therein;
    forming a second crankshaft segment into a shape which includes a second half of a main bearing journal, said second main journal half having an enlarged bore formed therein;
    forming complementary engageable faces on said first and second journal halves;
    aligning the first and second journal halves so that said engageable faces thereof are in juxtaposition;
    relatively rotating the first and second crankshaft segments and forcing the faces of the first and second journal halves into rubbing contact to form a friction weld therebetween.

2. A method of manufacturing a light-weight crankshaft as set forth in claim 1 further including the step of forming a connecting rod journal on said second segment.

3. A method as set forth in claim 1 further including the step of forming a counterweight upon said first segment opposite to said connecting rod journal.

4. A method as set forth in claim 2 further including the step of forming a counterweight upon each crankshaft segment at a location opposite the respective connecting rod journals.

5. A method of manufacturing a lightweight crankshaft consisting of an assembly of discrete elements comprising the steps of; forming at least one main bearing journal having a tubular shape; forming at least one connecting rod journal having a tubular shape; forming a plurality of web elements each having complementary faces thereon for engaging either a main bearing journal or a connecting rod journal; joining the web elements to the main journal and the rod journal by means of friction welding.

6. A method of manufacturing a lightweight crankshaft as set forth in claim 5 wherein the web elements are formed of metals dissimilar from those forming the main bearing journal and the rod journal.

* * * * *